(12) United States Patent
Sharma et al.

(10) Patent No.: US 9,594,848 B2
(45) Date of Patent: Mar. 14, 2017

(54) LOAD BALANCING FOR MULTI-TIERED QUERYING

(71) Applicant: Facebook, Inc., Menlo Park, CA (US)

(72) Inventors: Arun Dattaram Sharma, Union City, CA (US); Jianming Wu, Fremont, CA (US); Chunhui Zhu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 239 days.

(21) Appl. No.: 14/531,096

(22) Filed: Nov. 3, 2014

(65) Prior Publication Data

US 2016/0127256 A1    May 5, 2016

(51) Int. Cl.
*G06F 15/173* (2006.01)
*G06F 17/30* (2006.01)

(52) U.S. Cl.
CPC .............................. *G06F 17/30914* (2013.01)

(58) Field of Classification Search
CPC .. H04L 47/276; H04L 47/70; G06F 17/30914
See application file for complete search history.

*Primary Examiner* — Ryan Jakovac
(74) *Attorney, Agent, or Firm* — Perkins Coie LLP

(57) ABSTRACT

Technology is disclosed for establishing a querying system and load balancing the multi-tiered querying system. A multi-tiered targeted query system can comprise three tiers: a web tier, an aggregator tier, and a shard tier. When load balancing of shards is performed, fan-out can occur, increasing latency. The disclosed technology performs load balancing while minimizing the amount fan-out increase. Selecting the databases to move can comprise determining which databases on that server are causing the most load, and determining if moving any of these databases will increase an expected amount of fan-out above an acceptable threshold value. Determining the expected amount of fan-out increase incurred by moving a database can be based on an analysis of a number of friend relationships between that database and other databases on the same or other servers.

20 Claims, 6 Drawing Sheets

LOAD BALANCING FOR MULTI-TIERED QUERYING

BACKGROUND

Social networking has become one of the dominant ways people gather information and communicate. As the popularity of social networking has grown, social networking sites have attracted billions of users.

The information generated by or for these users cannot be efficiently stored by a single computing device, and as the number of users grows, this information can become spread across thousands of servers. This distribution of information, known as "fan-out," can cause a single query such as "which users performed action X," to be executed by each of the thousands of servers, even though only some of these servers house a part of the requested data. Because of this query distribution, various latencies can be experienced.

Furthermore, for any given page within a social networking site, multiple queries can be executed requiring sophisticated server software to search through vast stores of data to gather information relating to hundreds or even thousands of users. At any given time, millions of these page requests can occur contemporaneously, e.g. when users visit web pages, or "timelines" of their friends or other users.

Despite this complexity, the transition from one web page ("page") to another within a social networking website appears simple to end users, and unless this page retrieval process occurs with no perceptible delays, users may lose patience and simply navigate to a different website.

DETAILED DESCRIPTION

Figure 1:
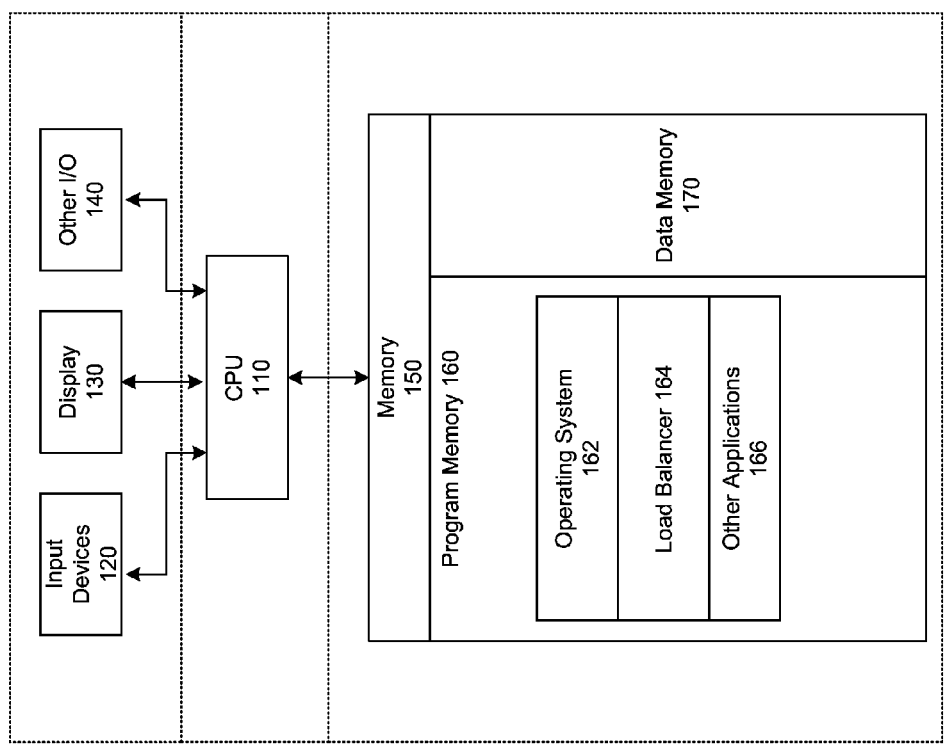
FIG. 1 is a block diagram illustrating an overview of devices on which some embodiments of the disclosed technology can operate.

Technology is disclosed herein for establishing a multi-tiered targeted query system and performing load balancing on the multi-tiered targeted query system. A multi-tiered targeted query system can have server computing devices ("servers") organized into at least three tiers: a web tier, an aggregator tier, and a shards tier. Servers at the web tier can be configured to service user data requests and pass them to servers at the aggregator tier. Servers at the aggregator tier can be configured to determine which selected shard servers have access to (e.g. store or be able to access) the requested information; formulate queries for the selected shard servers; send the queries to the selected shard servers; and aggregate results from the selected shard servers. Servers at the shard level can be configured to store data, receive queries on that data, and return results for received queries. As the term "shard" is used herein, a shard is a server or one or more databases stored at a server at the shard tier. In some implementations, a single physical server can store multiple shard, e.g. as multiple virtual servers or databases.

Shards can store information for one or more user clusters. For each user in a group of users, a cluster may be known based on relationships among the users, such as each user being connected as "friends" to a relatively high number of other users within their cluster. Each shard is established to include data corresponding to users within the same cluster and each aggregator server is provided with the mapping of users/user data to shards. In some implementations, the data corresponding to the users comprises data about what content items each user has "liked." In some implementations, an index can be established for each shard indicating, for each user, which content items that user has liked. In some implementations, an inverse index can be established for each shard indicating, for each content item, which users have liked that content item.

When operating a multi-tiered targeted query system, servers at the shard tier may experience heavy load, which can lead to latency. "Load," as used herein, refers to a reduction of any resource available to a computing device, such as CPU cycles, memory accesses, or available network bandwidth. Load can result, for example, from one or more applications utilizing the processor, memory, network interface, or other system resources. The latency due to load on a server at the shard tier in a multi-tiered targeted query system can be reduced by distributing the more loaded shards across servers at the shard tier. However, distributing shards may increase latency due to fan-out if moving a shard to a different server decreases the number of friends between the moved shard and the other shards on the server storing that shard. Thus, it is desirable to be able to distribute shards between shard tier servers, while minimizing the amount of increase in fan-out due to shard re-distribution.

This shard re-distribution, referred to herein as load balancing, can be performed by selecting one or more servers (e.g., virtual or physical) at the shard tier to load balance. Each of the selected servers can store multiple shard databases. The databases on the selected servers can be analyzed to determine which, if any, databases stored on that server should be moved. Selecting the databases to move can comprise determining which databases on the selected server are causing the most load and determining if moving one or more of these databases to another server would increase an expected amount of fan-out above an acceptable threshold value. Determining the expected amount of fan-out increase incurred by moving a database can be based on an analysis of a number of friend relationships between that database and other databases on the same server. When a database is moved to another server, the other server can be selected based on minimizing fan-out. If there is a tie between the amount of fan-out that is expected to occur by moving the database to two or more other servers, the other server with the least load can be selected as the destination for the database.

By grouping data according to user relationships, such as by establishing shards to store clusters of data for users in the same friend groups, and by load balancing shards to prevent server overload while minimizing fan-out, the number of queries required to fulfill a data request can be decreased while maintaining server response time for individual queries. In doing so, the overall user experience for all viewing users may be improved.

Several embodiments of the described technology are discussed below in more detail in reference to the figures. Turning now to the figures, FIG. 1 is a block diagram illustrating an overview of devices 100 on which some embodiments of the disclosed technology may operate. The devices can comprise hardware components of a device 100 for operating a multi-tiered targeted query system. Device 100 includes one or more input devices 120 that provide input to the CPU (processor) 110, notifying it of actions performed by a user. The actions are typically mediated by a hardware controller that interprets the signals received from the input device and communicates the information to the CPU 110 using a communication protocol. Input devices 120 include, for example, a mouse, keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a BUS, such as a PCI BUS or SCSI BUS. The CPU 110 can communicate with a hardware controller for devices, such as for a display 130. Display 130 can be used to display text and graphics. In some examples, display 130 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external devices, camera, printer, speakers, CD-ROM drive, DVD drive, disk drives, or Blu-Ray devices.

In some implementations, the device 100 also includes a communication device capable of communicating wirelessly or wire-based with a network node. The communication device can communicate with another device or a server through a network using, for example, TCP/IP protocols. For example, device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, Load Balancer 164, and any other application programs 166. Memory 150 also includes data memory 170 that can include shard mapping data, friend relationship data, configuration data, settings, user options or preferences which can be provided to the program memory 160, or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
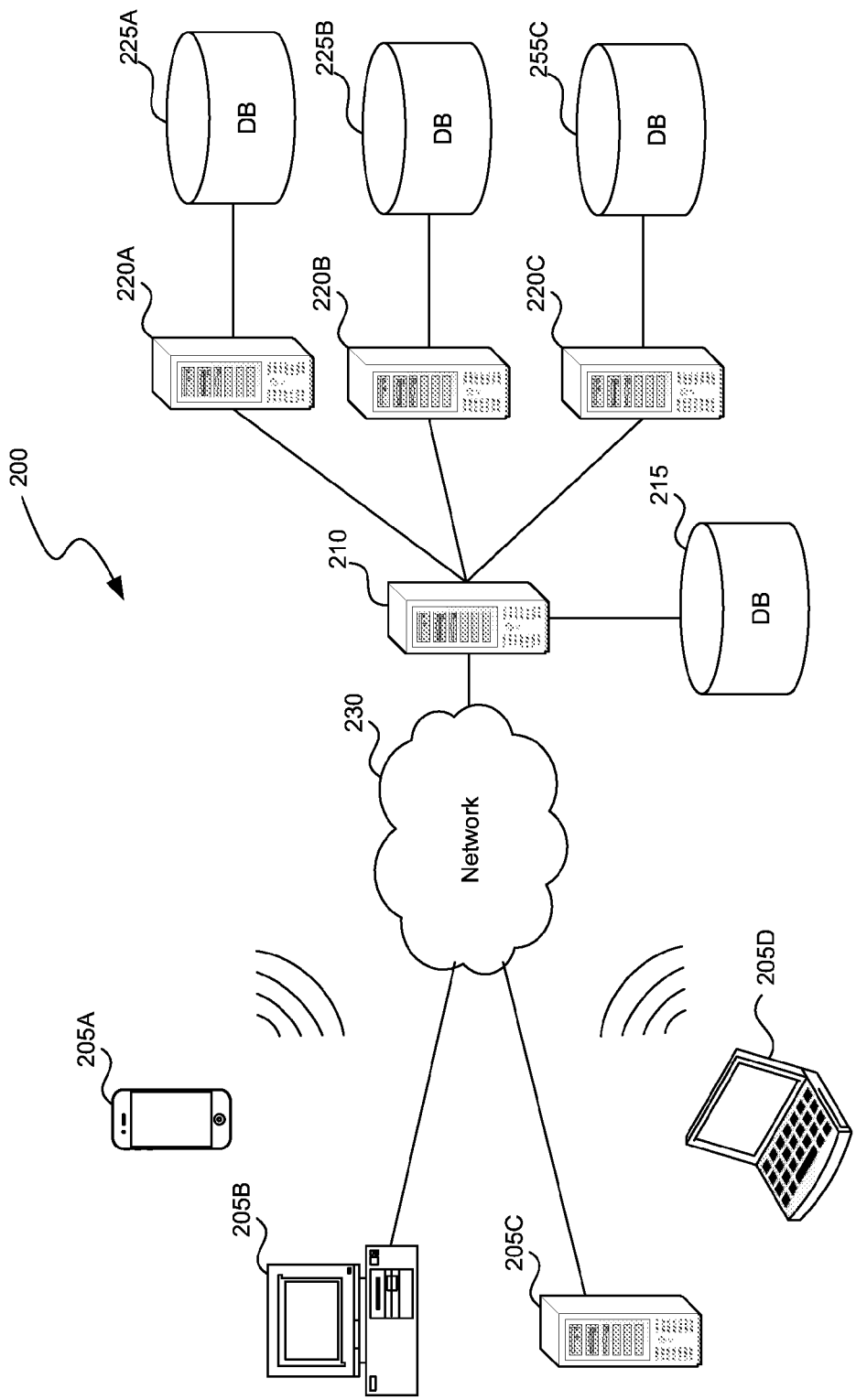
FIG. 2 is a block diagram illustrating an overview of an environment in which some embodiments of the disclosed technology can operate.

FIG. 2 is a block diagram 200 illustrating an overview of an environment in which some embodiments of the disclosed technology may operate. An environment for implementing the technology can include one or more client computing devices 205A-D, examples of which may include device 100. Client computing devices 205 can operate in a networked environment using logical connections 210 through network 230 to one or more remote computers such as server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple servers located at the same or at geographically disparate physical locations. In some implementations, each server 220 corresponds to a group of servers. For example, server group 220A can have 80 servers. In some implementations, three of these 80 servers are backup servers, and of the remaining 77 servers, 70 may operate shards storing data for clusters of users. The remaining seven servers can be reserved for new users who have not yet been assigned to a cluster. As users assigned to these seven servers are identified as being in a particular cluster, they can be deleted from the seven new-user servers and added to one of the 70 shard-bearing servers in this or another group of servers.

Client computing devices 205 ("clients") and server computing devices 210 and 220 ("servers") can each act as a server or client to other server/client devices. Server 210 can connect to a database 215. Database 215 can warehouse information such as server load, user relationships, and mappings between users and shards.

Servers 220A-C can each connect to a corresponding database 225A-C. As discussed above, each server 220 may correspond to a group of servers, and each of these servers can share a database or can have their own database. Though databases 215 and 225 are displayed logically as single units, databases 215 and 225 can each be a distributed computing environment encompassing multiple servers, can be located within their corresponding server, or can be located at the same or at geographically disparate physical locations. Continuing the previous example, each of the 70 databases comprising the servers with shards can operate its own database 225A, and that database can store multiple shards. In some implementations, there can be 200-300 shards per server database 225. Databases 225 can warehouse information such as user profile data and records of actions taken by users. For example, databases 225 can store correspondences between users who performed a "like" operation in relation to particular content items.

As a server 210 targets queries to servers 220 based on the targeted server 220 being associated with a database 225 determined to store information which may be relevant to the query, some servers 220 or databases 225 can experience load which causes that server 220 or database 225 to perform slowly as compared to the other servers 220 and databases 225. As the load on any server 220 or database 225 increases, the shards from a database 225 can be moved another database 225, thereby balancing load across server 220 and databases 225. This shard movement can be predicated on minimizing fan-out and/or load.

Network 230 can be a local area network (LAN) or a wide area network (WAN), but can also be other wired or wireless networks. Network 230 may be the internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
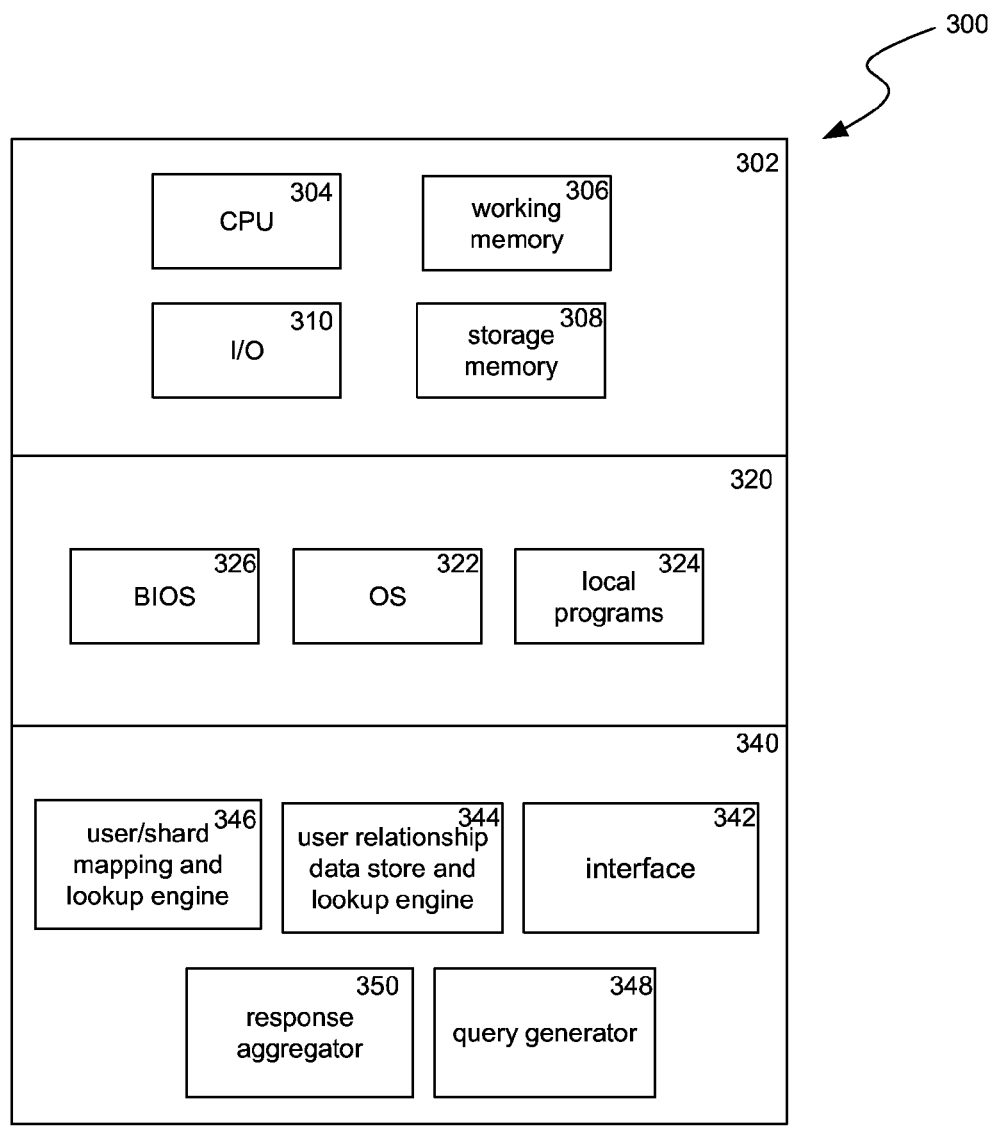
FIG. 3 is a block diagram illustrating components which, in some embodiments, can be used in a system implementing servers of the disclosed technology.

FIG. 3 is a block diagram illustrating components 300 which, in some embodiments, can be used in a system implementing servers of the disclosed technology. The components 300 include hardware 302, general software 320, and specialized components 340. As discussed above, a system implementing the disclosed technology can use various hardware including a central processing unit 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include a user relationship data store and lookup engine 344, a user/shard (user-to-shard) mapping and lookup engine 346, a query generator 348, a response aggregator 350, and components which can be used for controlling and receiving data from the specialized components, such as interface 342.

User relationship data store and lookup engine 344 can be an arranged storage system that holds information about relationships between users, such as which pairs of users are friends or are friends-of-friends. User relationship data store and lookup engine 344 can service queries such as "find the users who are friends of user X" and "find the friends or friends-of-friends of user Y," or more generally "find the users who have relationship(s) R to user(s) U." In some implementations, the user relationship data store can house, in addition to the indications of relationships between various users, a weight value indicating an estimate of the strength of that relationship. These weight values can be based on factors such as how many friends the users have in common, how much the users interact, the similarity of the content with which the users interact, and data about the user, such as geographical and biographical information. For example, a weight scale can be between 0 and 1, on this scale a relationship between user X and user Y, where user X is friends with user Y, lives in the same geographical area as user Y, has 40% of the same friends as user Y, and has frequent interactions with user Y, can be assigned a weight of 0.85. Conversely, on the same scale, a relationship between user A and user B, where user A and B have a friends relationship but have few other friends or friends-of-friends in common and rarely interact with each other or the same content, can be assigned a weight value of 0.05.

User/shard mapping and lookup engine 346 can be an arranged storage system that holds information about which shard has the information corresponding to particular users. User/shard mapping and lookup engine 346 can service queries such as "find the shard for user(s) X" and "find the server holding the shard for user(s) Y." In some implementations, results can also be sorted with the shards with the most friends of the identified user appearing first. In some implementations, results can be sorted based on weighted values of user relationships. Each shard can be assigned a value calculated by summing the weighted values for the relationships between the users in a shard and the users identified in the data request. For example, a data request may be for the like operations of friends of user X. User X may be friends with users A, B, and C, whose data is stored by shard S, and may be friends with user D, whose data is stored by shard T. The weighted value for the relationship between X and A may be 0.25, between X and B may be 0.03, and between X and C may be 0.3, thus the sum of 0.58 may be assigned to shard S. The weighted value for the relationship between X and D may be 0.75, thus 0.75 may be assigned to shard T. Because shard T has a higher weight value it can be ordered before shard S.

Query generator 348 can generate queries to send to shards. Query generator 348 can use a received query, can reformulate a received query, or can generate a new query. In some implementations, query generator 348 can generate generic queries that can be passed to multiple shards, such as "find the users on this shard that liked content item X." In some implementations, query generator 348 can generate queries that are specific to a particular shard. For example, query generator 348 can be generating a query to service a data request amounting to: "find the friends of user U who liked content item C." Query generator 348 can also receive information from user/shard mapping and lookup engine 346 that users J, K, and L are friends of user U and the data for these users are on shard S. Query generator 348 can then generate a query for shard S such as "of users J, K, and L, find the user that liked content item C."

Response aggregator 350 can receive the results generated from queries sent to one or more shards, either all at once or incrementally, and combine them into a single result set; this result set can be passed through interface 342 to respond to a data request.

Figure 4:
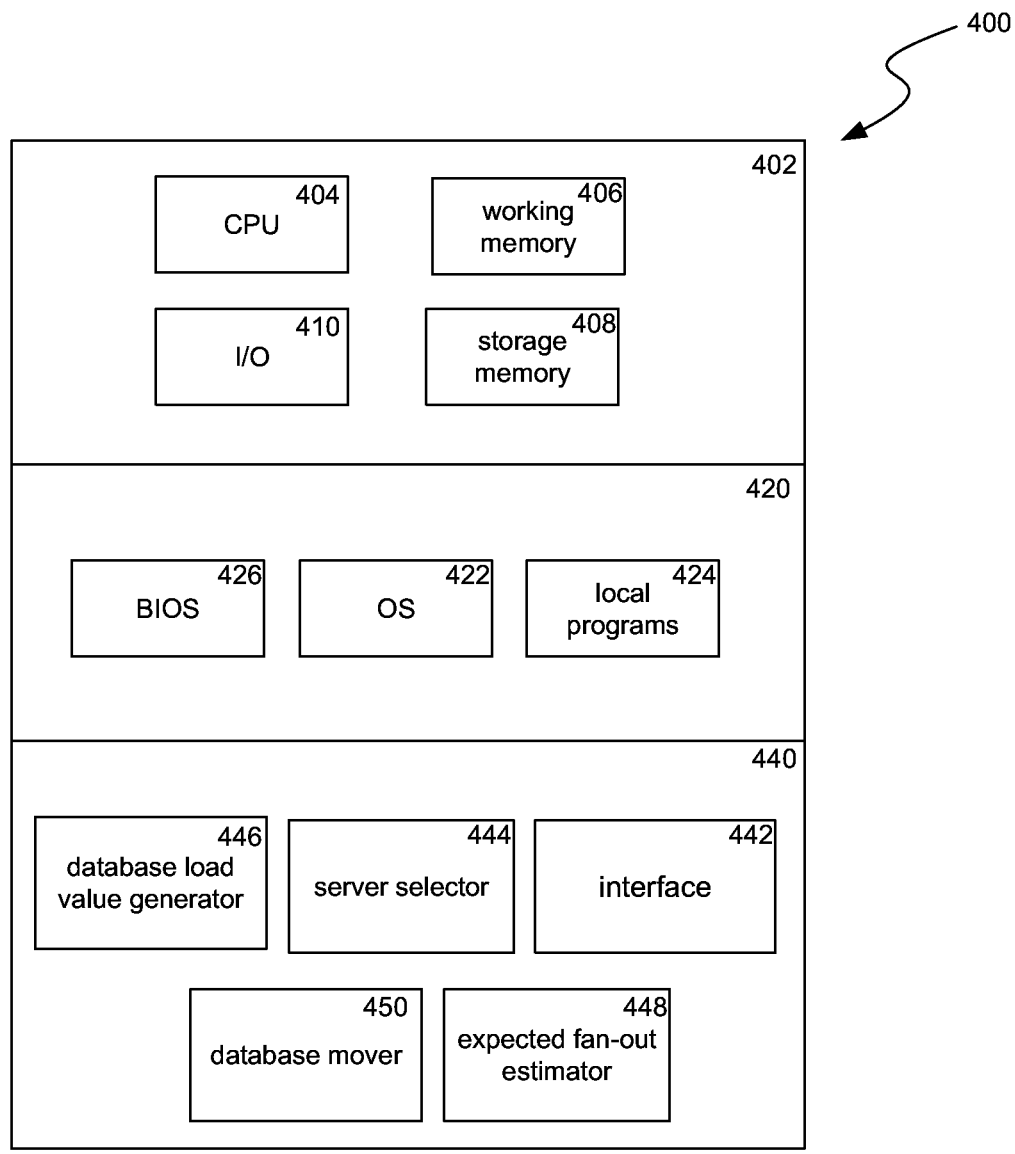
FIG. 4 is a block diagram illustrating components that, in some embodiments, implement load balancing for the disclosed technology.

FIG. 4 is a block diagram illustrating components 400 that, in some embodiments, implement load balancing for the disclosed technology. The components 400 include hardware 402, general software 420, and specialized components 440. As discussed above, a system implementing the disclosed technology can use various hardware including a central processing unit 404, working memory 406, storage memory 408, and input and output devices 410. Components 400 can be implemented in a client computing device such as client computing devices 205 or on a server computing device, such as server computing device 210 or 220.

General software 420 can include various applications including an operating system 422, local programs 424, and a BIOS 426. Specialized components 440 can be subcomponents of a general software application 420, such as a local program 424. Specialized components 440 can include a server selector 444, a database load value generator 446, an expected fan-out value estimator 448, a database mover 450, and components which can be used for controlling and receiving data from the specialized components, such as interface 442.

Server selector 444 can select a set of one or more servers, from among the servers at a shard tier, which should be analyzed for load balancing. In various implementations, the set of servers can be selected by: sorting servers at the shard tier based on their current load and selecting a number or percentage that are the most loaded, selecting servers at the shard tier that have a load above a threshold value, selecting all the servers at the shard tier, or progressing through servers at the shard tier in some other ordering until a stopping point is reached. In some implementations, only servers storing two or more shards can be selected, as no benefit to the overall system would be gained by moving a database from a server storing only that database to another server. Indications of the selected servers can be passed to database load value generator 446 and/or expected fan-out value estimator 448.

Database load value generator 446 can receive one or more indications of servers and can compute a load value for one or more of the database stored by the indicated servers. Each computed load value indicates an amount of load generated by that database on the server storing that database. Computed load values can be based on any resource use measurement, such as an amount of CPU cycles consumed by processes serving that database, a rate of memory accesses by that database, an amount of network bandwidth consumed in relation to that database, or any combination thereof.

Expected fan-out value estimator 448 can also receive one or more indications of servers and compute, for one or more of the databases stored by the indicated servers, a value indicating an expected amount of fan-out increase from moving this database to another server. The value indicating the expected amount of fan-out increase can be based on a number of friend relationships between users with data stored in this database and users with data stored in other databases on the same server. In some implementations, the value indicating the expected amount of fan-out increase is based on a number of friend relationships between users with data stored in this database and users with data stored on a candidate server to which that database could be moved. For example, fan-out value estimator 448 can assign a value indicating an expected amount of fan-out increase to database A on server X. Server X may also store databases B and C. There may be 2,000 friend relationships between the users with data stored by database A and the users with data stored by databases B and C. The best candidate server which database X may be moved to may be server Y, which stores database D and E. There may be 500 friend relationships between the users with data stored by database A and the users with data stored by databases D and E. The value indicating this potential change in friend relationships on the same server, can be computed, for example, by subtracting 500 from 2,000, indicating an expected amount of fan-out increase value of 1,500.

Database mover 450 can select one or more databases to move based on the load value and/or value indicating an expected amount of fan-out increase for each database. In some implementations each database on a server can be assigned a load value and/or value indicating an expected amount of fan-out increase before databases are selected to be moved. In some implementations, less than all databases on a server can be assigned a load value and/or value indicating an expected amount of fan-out increase before databases are selected to be moved, where those databases with a value that exceeds a threshold can be moved without having assigned a load value or an expected amount of fan-out increase to other databases on that server. In some implementations, each database on a server can be assigned a load value and the databases are assigned an expected amount of fan-out increase in and order according to their load values. These databases can be moved prior to assigning other databases an expected amount of fan-out increase if the assigned expected amount of fan-out increase exceeds a threshold. Once one or more databases are selected to be moved, instructions to move those databases can be passed by database mover 450 through interface 442.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc.

Figure 5:
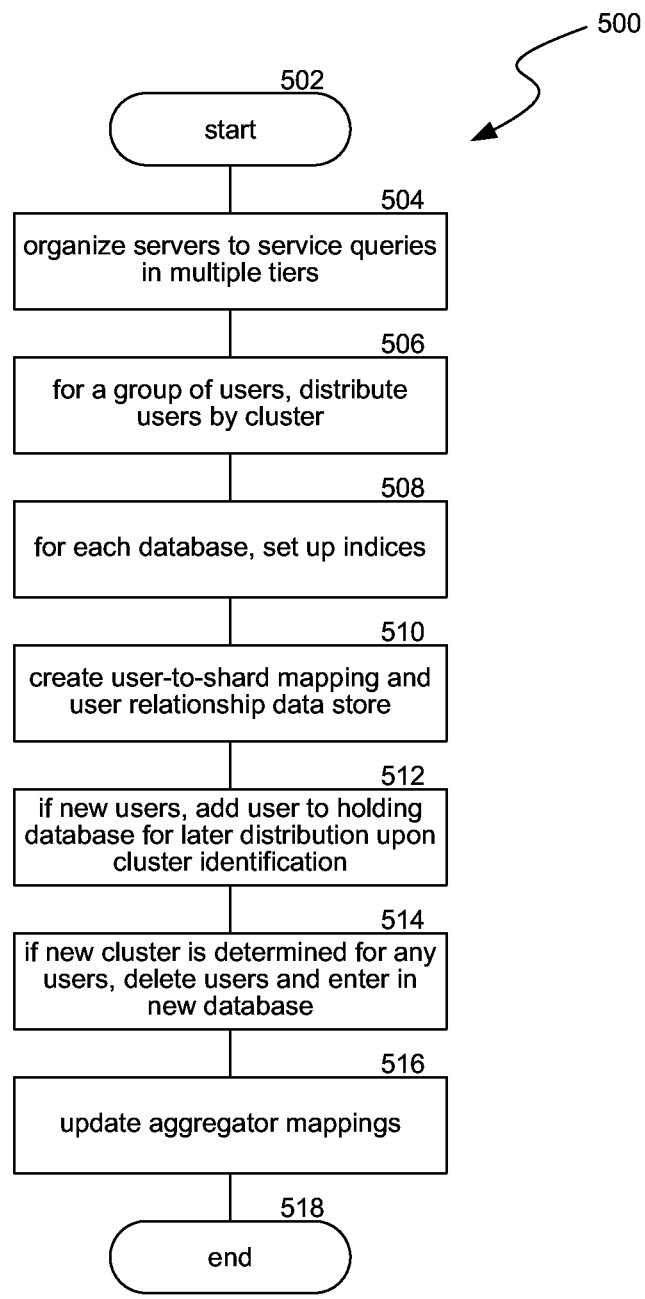
FIG. 5 is a flow diagram illustrating a process used in some embodiments for establishing a multi-tiered targeted system for querying user data.

FIG. 5 is a flow diagram illustrating a process 500 used in some embodiments for establishing a multi-tiered targeted system for querying user data. The process begins at block 502 and continues to block 504. At block 504, servers are organized into three tiers to service queries. These tiers can include a web tier, an aggregator tier, and a shard tier. Servers at the web tier originate data requests which are passed to an aggregator server at the aggregator tier. Aggregator servers at the aggregator tier are configured to receive data requests, formulate queries, and send the queries to selected servers at the shard level. Servers at the shard tier are configured to store information about users and execute queries from the aggregator servers on that stored information. In some implementations, a single server can perform functions at multiple tiers. For example, a server can perform both aggregator functions, such as receiving data requests and formulating queries, and shard functions, such as storing user data and executing those queries.

Next, at block 506, information relating to users is distributed to shards according to established clusters. A cluster can be a grouping of users that provides a relatively high density of users that share a particular relationship, such as the number of users within the cluster being friends. In some implementations, entries within each shard are further organized according to similarity between users. Similarity between users can be based on factors such as how many friends the users have in common, the similarity of the content with which the users interact, and data about the users, such as geographical and biographical information.

At block 508, one or more indices can be established for each shard. In some implementations, each shard can have a user-to-data index. A user-to-data index can correlate, for each user, what content items that user has performed particular operations for, such as a "like" operation. In some implementations, each shard can also or instead have a data-to-user index. A data-to-user index can correlate, for each content item, which users have performed a particular operation, such as a "like" operation, for that content item.

At block 510, a mapping is created to be stored in each server at the aggregator level. This mapping provides a correspondence between users and the shard that stores the data for that user. This mapping is based on the distribution of users performed in block 506. In some implementations, one or more servers other than aggregator servers can store the mapping, which can then be accessed by various aggregator servers to perform user-to-shard lookups. At block 510, a data store is also created that correlates users by relationship, such as users having a friend relationship.

At block 512, new users can be added to the system. In some implementations, adding a new user is accomplished by adding the new user to a shard designated for new users. In some implementations, the new user can be assigned to a shard randomly or can be assigned to a cluster based on factors such as geographic location, browsing history, ethnicity, or other information known about the new user.

At block 514, as relationship information about the user is acquired sufficient to assign the user to a cluster, the user can be deleted from the new user shard and added to the shard holding the data for the users in that cluster.

At block 516, the user-to-shard mappings are updated to reflect the mapping between the new user and the shard storing the data for that new user. Also at block 516, the user relationship data store is updated to indicate which other users are in a friend relationship with the new user. At block 518, the process ends.

Figure 6:
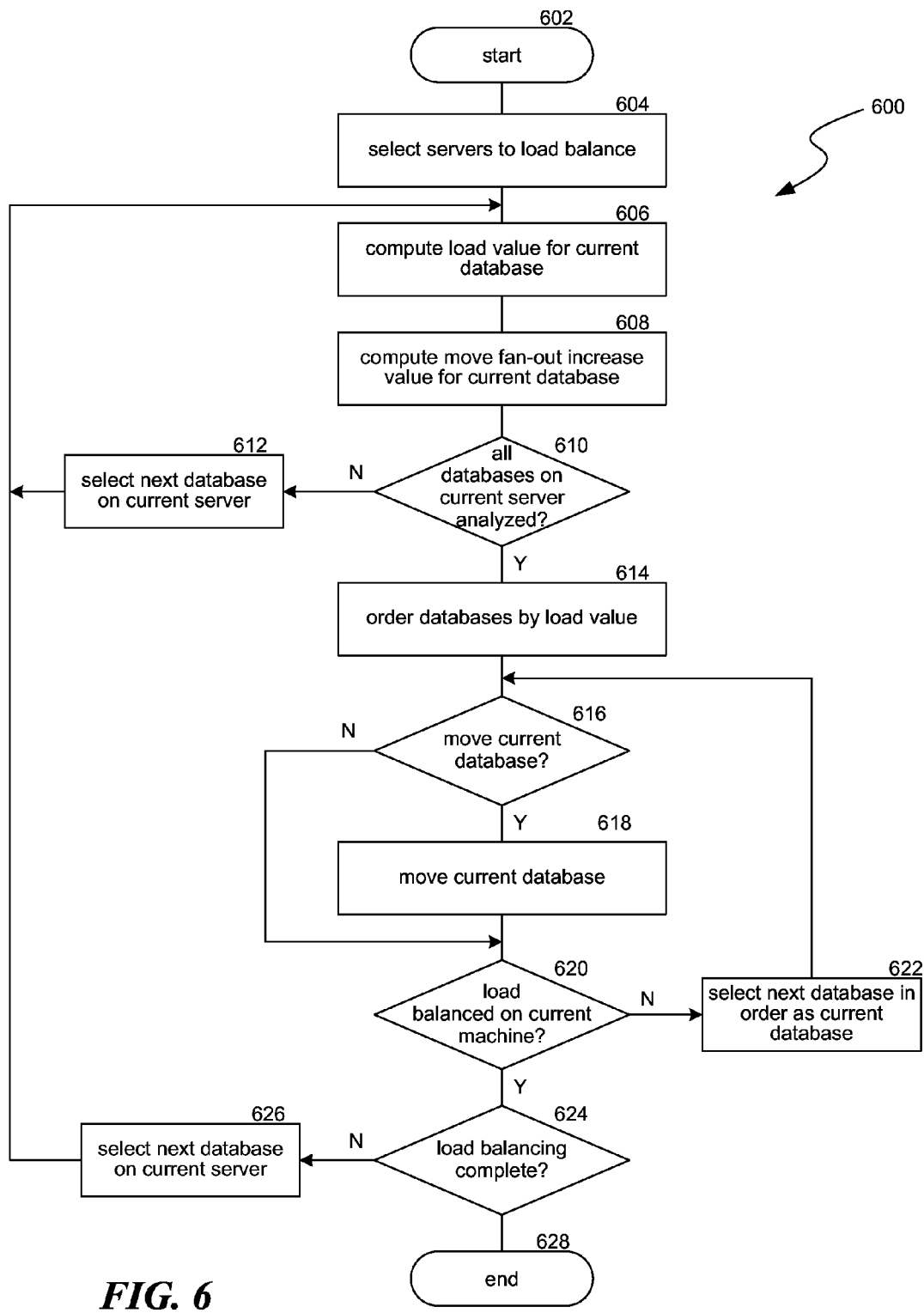
FIG. 6 is a flow diagram illustrating a process used in some embodiments for performing load balancing among servers at a shard tier of a multi-tiered targeted query system.

FIG. 6 is a flow diagram illustrating a process 600 used in some embodiments for performing load balancing among servers at a shard tier of a multi-tiered targeted query system. The process begins at block 602 and continues to block 604. At block 604, the process selects one or more servers on which to perform load balancing. These selected servers can be servers at the shard tier of a multi-tiered targeted query system. In various implementations, the selection of these servers can be performed by: sorting servers at the shard tier based on their current load and selecting one or more of the most loaded servers, selecting servers at the shard tier that have a load above a threshold value, selecting all the servers at the shard tier, progressing through servers at the shard tier in another ordering until a stopping point is reached, or receiving an indication from a server that it should be load balanced. In some implementations, only servers storing two or more shard databases can be selected, as no benefit to the overall system would be gained by moving such a database to another server. In some implementations, the selected servers can be ordered by an amount of load on the servers or by a lack of one or more available resources on the servers. Once one or more servers have been selected to load balance, the process continues to block 606.

Beginning with block 606, the process begins cycling through databases on each of the selected servers. If this is the first iteration through the loop of selected servers, a first server of the selected servers is chosen as the current server. If, for the current server, this is the first iteration through the loop of databases on that server, a first database of the databases on the current server is selected as the current database.

At block 606, a load value is computed for the current database. The computed load value indicates an amount of load on the current server generated by the current database. The computed load value can be based on any resource use measurement, such as an amount of CPU cycles consumed by processes serving the current database, a rate of memory accesses by the current database, an amount of network bandwidth consumed in relation to the current database, or any combination thereof.

At block 608, a fan-out increase value is computed for the current database indicating an expected amount of fan-out incurred by moving the current database from the current server to another server. The fan-out increase value can be based on a number of friend relationships between users with data stored in the current database and users with data stored in other databases on the current server. In some implementations, the fan-out increase value is based on a number of friend relationships between users with data stored in the current database and users with data stored on a server other than the current server to which that database could be moved. Computing the fan-out increase value can be based on a mapping of users to shards. Such a mapping of users to shards can be computed prior to initiating the process to load balance servers, thereby increasing the efficiency of the load balancing process.

At block 610, the process determines whether the loop has cycled through the databases on the current server. In some implementations determining that the loop has cycled through the databases on the current server can comprise determining whether every shard database on the current server has been assigned a load value and a fan-out increase value. In some implementations determining that the loop has cycled through the databases on the current server comprises determining that, prior to assigning values to every database stored by the current server, a stopping point for the loop of the databases has been reached. A stopping point could be that a number or percentage of shard databases have been looped through or that a number or percentage of shard databases have been assigned one or more of a load value above a specified threshold and a fan-out increase value below a specified threshold. If the process determines that the loop has cycled through the databases on the current server, process 600 continues to block 614, otherwise process 600 continues to block 612. At block 612, the next database stored by the current server is set as the current database, which the loop between blocks 606 to 610 will operate on next.

At block 614, the databases on the current server which have been assigned a load value are sorted according to their load value. The database with the highest load value is set as the current database.

Next, at block 616, process 600 determines whether to move the current database to another server. The determination of whether to move the current database can be based on a determination that the fan-out increase value for the current database is below a threshold value. In some implementations the determination of whether to move the current database can be further based on a combination of the load value and the fan-out increase value. For example, this can be a ratio of the load value over the fan-out increase value. When this ratio is above a threshold value, indicating that the fan-out increase is acceptable in relation to the decrease in load, process 600 determines to move the current database to another server. If process 600 determines to move the current database to another server, process 600 continues to block 618, otherwise process 600 continues to block 620.

At block 618, the current database is moved to another server. The server the current database is moved to can be selected based on one or more of the change in fan-out that will result from moving the current database to the new server and the current load on the new server. In some implementations, only servers with a current load below a threshold, or for which moving the current database to that server will not increase the load on the new server above a threshold, are available to receive the current database. In various implementations, the server that will minimize an increase in fan-out is selected to receive the current database and if there is a tie between the increase in fan-out for two candidate servers to which the current database may be moved, the candidate server with the lowest current load is selected to receive the current database. Once the database is moved, process 600 continues to block 620.

At block 620, process 600 determines whether the current server has been sufficiently load balanced. In various implementations, the current server has been sufficiently load balanced when its load has been decreased below a certain threshold value, when its load has been decreased below a percentage of its load prior to the start of process 600, or when its available resources are above a particular threshold level. In some implementations the determination of whether the current server has been sufficiently load balanced is based on a comparison of the load of the current server to the loads on other shard tier servers. For example, process 600 can determine that the current server has been sufficiently load balanced when its load is within a certain amount of the average load across the servers of the shard tier. In various implementations the determination of whether the current server has been sufficiently load balanced is based having determined that all databases on the current server, or all databases on the current server with load value above a threshold, have been reviewed to be moved. If the current server has not been sufficiently load balanced process 600 continues to block 622. At block 622, the next database in the order is set as the current database, which the loop between blocks 616 to 620 will operate on next. If the current server has been sufficiently load balanced process 600 continues to block 624.

At block 624, process 600 determines whether load balancing of the selected servers is complete. If load balancing of the selected servers is not complete, the process continues to block 626, where the next server in the set of servers selected in block 604 is set as the current server, which the loop between blocks 606 to 624 will operate on next. If load balancing of the selected servers is complete, process 600 continues to block 628, where it ends.

Several embodiments of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

We claim:

1. A method performed by a computing device for minimizing fan-out in a database load balancing process, comprising:
   selecting one or more servers to load balance;
   for one or more of the selected servers:
      for two or more databases of at least two databases stored by that selected server:
         computing a load value for that database;
         computing a fan-out increase value, wherein the fan-out increase value indicates an expected amount of fan-out incurred by moving that database from that selected server to another server, wherein the computed expected amount of fan-out increase is based on an analysis of a number of friend relationships between that database and other databases stored by that selected server; and
      selecting one or more databases, of the two or more databases, to move from that selected server to another server, wherein selecting the one or more databases is based on the load value computed for that database and the fan-out increase value for that selected database.

2. The method of claim 1 wherein selecting the one or more databases is further based on one or more of:
   a determination that the load value computed for that database is higher than the load value computed for at least one other of the two or more databases; and
   a determination that the fan-out increase value computed for that database is lower than a fan-out increase threshold value.

3. The method of claim 1 wherein computing fan-out increase values is based on determining a number of friend connections between that database and the other databases of the at least two databases stored by that selected server.

4. The method of claim 3 wherein computing fan-out increase values is further based on a comparison of:
   the number of friend connections between that database and the other databases of the at least two databases stored by that selected server, and
   an expected number of friend connections between that database and other databases on a server other than that selected server to which that database could be moved.

5. The method of claim 1 wherein selecting one or more servers is based on an ordering of servers at a shard tier according to a computed current load on each selected server.

6. The method of claim 1 wherein selecting one or more servers comprises selecting servers at a shard tier that have a computed current load above a threshold value.

7. The method of claim 1 wherein computing a load value is based on one or more of:
   a CPU utilization by that database;
   a rate of memory accesses by that database; and
   an amount of network usage by that database.

8. The method of claim 1 wherein the analysis of a number of friend relationships between that database and other databases on that selected server is based on a mapping of users to servers.

9. The method of claim 8 wherein mapping of users to servers is computed prior to initiating the database load balancing process.

10. A non-transitory computer readable medium storing instructions configured to, when executed by a computing system, cause the computing system to perform operations for minimizing fan-out in a database load balancing process, the operations comprising:
   selecting one or more servers to load balance;
   for one or more of the selected servers:
      for two or more databases of at least two databases stored by that selected server:
         computing a load value for that database;
         computing a fan-out increase value, wherein the fan-out value indicates an expected amount of fan-out incurred by moving that database from that selected server to another server, wherein the computed expected amount of fan-out increase is based on an analysis of a number of friend relationships between that database and other databases stored by that selected server; and
      selecting one or more databases, of the two or more databases, to move from that selected server to another server, wherein selecting the one or more databases is based on the load value computed for that database and the fan-out increase value for that selected database.

11. The non-transitory computer readable medium of claim 10 wherein computing a load value is based on one or more of:
a CPU utilization by that database;
a rate of memory accesses by that database; and
an amount of network usage by that database.

12. The non-transitory computer readable medium of claim 10 wherein selecting the one or more databases is based on a determination that the fan-out increase value computed for that database is lower than a fan-out increase threshold value.

13. The non-transitory computer readable medium of claim 10 wherein computing fan-out increase values is based on determining a number of friend connections between that database and the other databases of the at least two databases stored by that selected server.

14. The non-transitory computer readable medium of claim 13 wherein computing fan-out increase values is further based on a comparison of:
the number of friend connections between that database and the other databases of the at least two databases stored by that selected server, and
an expected number of friend connections between that database and other databases on a server other than that selected server to which that database could be moved.

15. The non-transitory computer readable medium of claim 10 wherein selecting one or more servers is based on an ordering of servers at a shard tier according to a computed current load on each selected server.

16. The non-transitory computer readable medium of claim 10 wherein the analysis of a number of friend relationships between that database and other databases on that selected server is based on a mapping of users to servers.

17. A system for minimizing fan-out in a database load balancing process, comprising:
a server selector that selects one or more servers to load balance;
a database load value generator that, for one or more of the selected servers:
for two or more databases of at least two databases stored by that selected server, computes a load value for that database;
an expected fan-out estimator that, for one or more of the selected servers:
for two or more databases of the at least two databases stored by that selected server:
computes a fan-out increase value, wherein the fan-out increase value indicates an expected amount of fan-out incurred by moving that database from that selected server to another server, wherein the computed expected amount of fan-out increase is based on an analysis of a number of friend relationships between that database and other databases stored by that selected server; and
a database mover that selects one or more databases, of the two or more databases, to move from that selected server to another server, wherein selecting the one or more databases is based on the load value computed for that database and the fan-out increase value for that selected database.

18. The system of claim 17 wherein the database mover selects the other server based on a determination that moving the one or more databases to the other server will minimize fan-out as compared to other servers in a shard tier.

19. The system of claim 17 wherein the server selector selects the one or more databases based on a determination that the fan-out increase value computed for that database is lower than a fan-out increase threshold value.

20. The system of claim 17 wherein the expected fan-out estimator computes fan-out increase values based on determining a number of friend connections between that database and the other databases of the at least two databases stored by that selected server.

* * * * *